US012627925B2

(12) United States Patent
Chen et al.

(10) Patent No.: US 12,627,925 B2
(45) Date of Patent: May 12, 2026

(54) MICROPHONE CAPSULE ASSEMBLY

(71) Applicant: Harman International Industries, Incorporated, Stamford, CT (US)

(72) Inventors: Ruihua Chen, Shenzhen (CN); Toly Wu, Shenzhen (CN); Justin Bao, Shenzhen (CN); Yi Zhang, Shenzhen (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 125 days.

(21) Appl. No.: 18/807,032

(22) Filed: Aug. 16, 2024

(65) Prior Publication Data

US 2026/0052341 A1 Feb. 19, 2026

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01); *H04R 2420/01* (2013.01); *H04R 2420/09* (2013.01)

(58) Field of Classification Search
None
See application file for complete search history.

(56) References Cited

U.S. PATENT DOCUMENTS 8,666,090 B1 * 3/2014 Townsend ............. H04R 3/005 381/92
10,157,628 B1 * 12/2018 Liu ......................... G06F 3/167
12,244,929 B1 * 3/2025 Risley .................. H04N 23/695
2007/0147634 A1 * 6/2007 Chu ....................... H04R 1/406 381/91
2008/0219485 A1 * 9/2008 Kantola ................. H04R 3/005 381/303
2015/0146883 A1 * 5/2015 Palitsky ................. H04R 3/005 381/92
2017/0164102 A1 * 6/2017 Ivanov ................... H04R 1/406
2020/0154201 A1 * 5/2020 Townsend .............. H04R 1/222
2021/0136487 A1 * 5/2021 Shumard ................ H04R 1/326
2021/0297775 A1 * 9/2021 Ikeda ................. H10D 30/6734
2022/0141579 A1 * 5/2022 Cochran .................. H04R 3/00 381/122
2023/0217164 A1 * 7/2023 Lu ........................... G10L 25/78 381/92
2023/0336912 A1 * 10/2023 Benattar .................. H04R 5/04
2024/0007786 A1 * 1/2024 Pentecost ................. H04R 1/40

FOREIGN PATENT DOCUMENTS

WO WO-2006071405 A1 * 7/2006 ............. H04R 3/005
WO WO-2021087377 A1 * 5/2021 ............. H04R 1/326

* cited by examiner

*Primary Examiner* — Qin Zhu
(74) *Attorney, Agent, or Firm* — Brooks Kushman P.C.

(57) ABSTRACT

A microphone assembly includes a microphone array and a mixer. The microphone array includes first, second, and third microphones. The mixer includes an analog switch assembly and an amplifier assembly configured to mix recording signals of the microphones in different manners to realize different recording patterns of the microphone array. The different recording patterns realizable by the microphone array may include the cardioid pattern, the omnidirectional pattern, the stereo pattern, and the bidirectional pattern.

11 Claims, 8 Drawing Sheets

MICROPHONE CAPSULE ASSEMBLY

TECHNICAL FIELD

The present disclosure relates to a microphone capsule assembly having a microphone array and an electronic device for combining recording signals of the microphones to realize different recording patterns of the microphone array.

BACKGROUND

To obtain optimal recording performance, four popular recording patterns are developed for a microphone to meet different recording scenarios and requirements. These recording patterns include the cardioid pattern in which the microphone picks up sound from its front side whereas sound from its rear side is attenuated, the omnidirectional pattern in which the microphone picks up sound from all around its sides, the stereo pattern in which the microphone picks up sound from its left-front and right-front sides separately in two channels to create a spatial effect, and the bidirectional pattern in which the microphone picks up sound from its front and rear sides whereas sound from its left and right sides is attenuated.

In early-stage microphone technology, these four recording patterns are realized using different microphones which typically required a complicated setup and equipment.

In subsequent microphone technology, these four recording patterns are realized using a microphone assembly having four microphones. In such a “4-in-1” microphone assembly, a first microphone faces frontward, a second microphone faces leftward, a third microphone faces rightward, and a fourth microphone faces rearward. Such microphone assembly further includes an electronic device having an audio codec integrated chip (IC) to combine the recording signals of the microphones to realize the four recording patterns. The electronic device further has a micro-controller (MCU) to realize USB signal input, output, and control.

SUMMARY

A microphone assembly including a microphone array and a mixer is disclosed. The microphone array includes first, second, and third microphones. The mixer includes an analog switch assembly and an amplifier assembly configured to mix recording signals of the microphones in different manners to realize different recording patterns of the microphone array.

The microphone array may include only the first, second, and third microphones.

The first microphone may be oriented to face in a leftward forward direction, the second microphone may be oriented to face in a rightward forward direction, and the third microphone may be oriented to face in a rearward direction. For instance, the first microphone may be oriented to face at an angle of about 45° relative to a given direction, the second microphone may be oriented to face at an angle of about −45° relative to the given direction, and the third microphone may be oriented to face at an angle of about 180° relative to the given direction.

The first, second, and third microphones may be unidirectional microphones.

The different recording patterns of the microphone array may include a cardioid recording pattern, an omnidirectional recording pattern, a stereo recording pattern, and a bidirectional recording pattern.

The analog switch assembly and the amplifier assembly may be configured to mix the recording signals of the microphones in a first manner by combining the recording signals of the first and second microphones and terminating the recording signal of the third microphone to realize the cardioid recording pattern. The analog switch assembly and the amplifier assembly may be configured to mix the recording signals of the microphones in a second manner by combining the recording signals of the first, second, and third microphones to realize the omnidirectional recording pattern. The analog switch assembly and the amplifier assembly may be configured to mix the recording signals of the microphones in a third manner by maintaining separation of the recording signals of the first and second microphones and terminating the recording signal of the third microphone to realize the stereo recording pattern. The analog switch assembly and the amplifier assembly may be configured to mix the recording signals of the microphones in a fourth manner by combining the recording signal of the first microphone, the recording signal of the second microphone, and an inverse of the recording signal of the third microphone to realize the bidirectional recording pattern.

The analog switch assembly may include first, second, and third switches. Each switch is switchable between an ON state and an OFF state. The amplifier assembly may include a first amplifier for outputting a left channel audio signal of the mixed recording signals and a second amplifier for outputting a right channel audio signal of the mixed recording signals.

When the first switch is switched to the ON state and the second and third switches are switched to the OFF state, the recording signals of the first and second microphones are combined into a combined recording signal with the left channel audio signal being according to the combined recording signal and the right channel audio signal being according to the combined recording signal whereby the recording signals of the microphones realize a cardioid recording pattern of the microphone array.

When the first and second switches are switched to the ON state and the third switch is switched to the OFF state, the recording signals of the first, second, and third microphones are combined into a combined recording signal with the left channel audio signal being according to the combined recording signal and the right channel audio signal being according to the combined recording signal whereby the recording signals of the microphones realize an omnidirectional recording pattern of the microphone array.

When the first, second, and third switches are switched to the OFF state, the recording signals of the first and second microphones are maintained separated with the left channel audio signal being according to the recording signal of the first microphone and the right channel audio signal being according to the recording signal of the second microphone whereby the recording signals of the microphones realize a stereo recording pattern of the microphone array.

When the first and third switches are switched to the ON state and the second switch is switched to the OFF state, the recording signals of the first and second microphones and an inverse of the recording signal of the third microphone are combined into a combined recording signal with the left channel audio signal being according to the combined recording signal and the right channel audio signal being according to the combined recording signal whereby the recording signals of the microphones realize a bidirectional recording pattern of the microphone array.

A microphone capsule assembly including first, second, third microphones and a mixer is also disclosed. The first microphone is oriented to face in a leftward forward direction, the second microphone is oriented to face in a rightward forward direction, and the third microphone is oriented to face in a rearward direction. The mixer includes an analog switch assembly and an amplifier assembly configured to mix recording signals of the microphones in a first manner to realize a cardioid recording pattern of the microphones, in a second manner to realize an omnidirectional recording pattern of the microphones, in a third manner to realize a stereo recording pattern of the microphones, and in a fourth manner to realize a bidirectional recording pattern of the microphones.

A method for a microphone capsule assembly having a microphone array including first, second, and third microphones in which the first microphone is oriented to face in a leftward forward direction, the second microphone is oriented to face in a rightward forward direction, and the third microphone is oriented to face in a rearward direction is also disclosed. The method includes mixing, using a mixer including (i) an analog switch assembly having first, second, and third switches and (ii) an amplifier assembly having a first amplifier and a second amplifier, recording signals of the microphones in different manners to realize different recording patterns of the microphone array.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present disclosure.

The present disclosure relates to a microphone capsule assembly. The microphone capsule assembly is operable for converting sound waves into electrical energy variations which may then be amplified, transmitted, and/or recorded. Microphones of the microphone capsule assembly are operable to detect the sound waves and the resulting electrical energy variations represent recording signals of the microphones. The microphone capsule assembly is operable to combine the recording signals, amplify the combined recording signals, and output the amplified, combined recording signals such as to a headphone having left and right headset ports for the left and right ears of an operator wearing the headphone to hear.

In further detail, the microphone capsule assembly includes an acoustic part and an electronics part. The acoustic part includes a microphone array having first, second, and third microphones. The electronics part includes an electronic device. The electronic device includes a mixer having an analog switch assembly and an amplifier assembly configured to mix recording signals of the microphones in different manners to realize different recording patterns of the microphone array. The different recording patterns that are realizable include the four popular recording patterns. As indicated, these four popular recording patterns are the cardioid pattern, the omnidirectional pattern, the stereo pattern, and the bidirectional pattern.

With the microphone array including three microphones and with the four popular recording patterns being realizable, the microphone capsule assembly is a "3-in-1" microphone assembly. In this case, for the acoustic part, only three microphones are used. For the electronic device, an analog switch assembly and an output amplifier assembly are used to mix recording signals of the microphones (i.e., to combine microphone signal combinations) to realize the different recording patterns. The analog switch assembly may include a three-piece analog switch integrated chip (IC) (i.e., the analog switch assembly may include first, second, and third switches). The output amplifier assembly may include a left channel output amplifier and a right channel output amplifier. The electronic device may further include a USB audio codec IC to realize USB signal input, output, and control.

Figure 1:
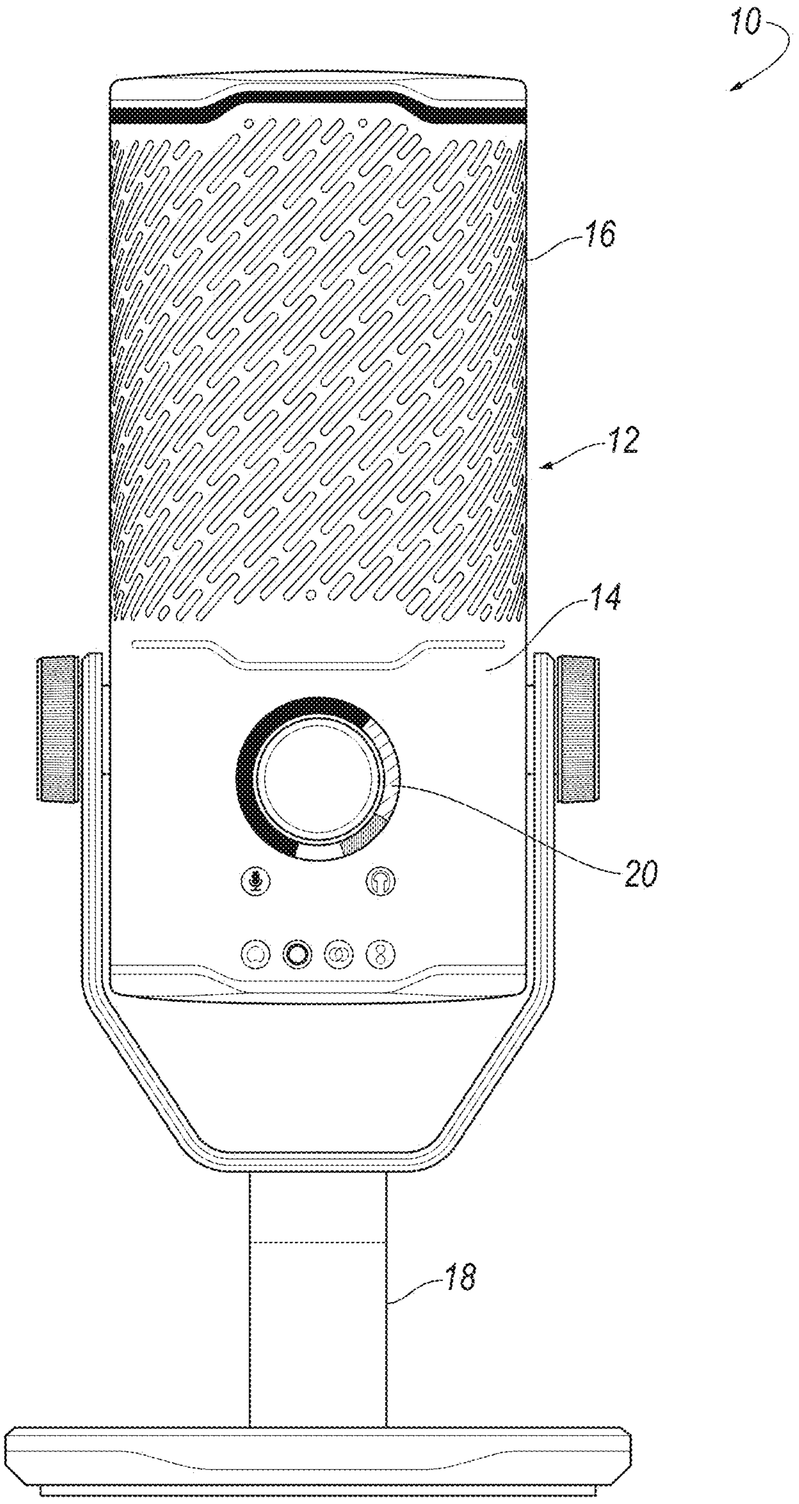
FIG. 1 illustrates a frontal view of a microphone capsule assembly.

Referring now to FIG. 1, a frontal view of a microphone capsule assembly 10 is shown. Microphone capsule assembly 10 includes a housing 12 having a body 14 and a cover 16. Microphone capsule assembly 10 further includes an acoustic part having a microphone array 30 (shown in FIG. 3) and an electronics part having an electronic device 50 (shown in FIG. 5). The acoustic part and the electronics part are encased within housing 12. Particularly, the acoustic part is disposed in an internal area of housing 12 under cover 14. The electronics part is disposed within body 14. Cover 16 is acoustically transparent such that audible signals that pass-through cover 16 maintain acoustic fidelity to acoustic part 30.

Figure 2:
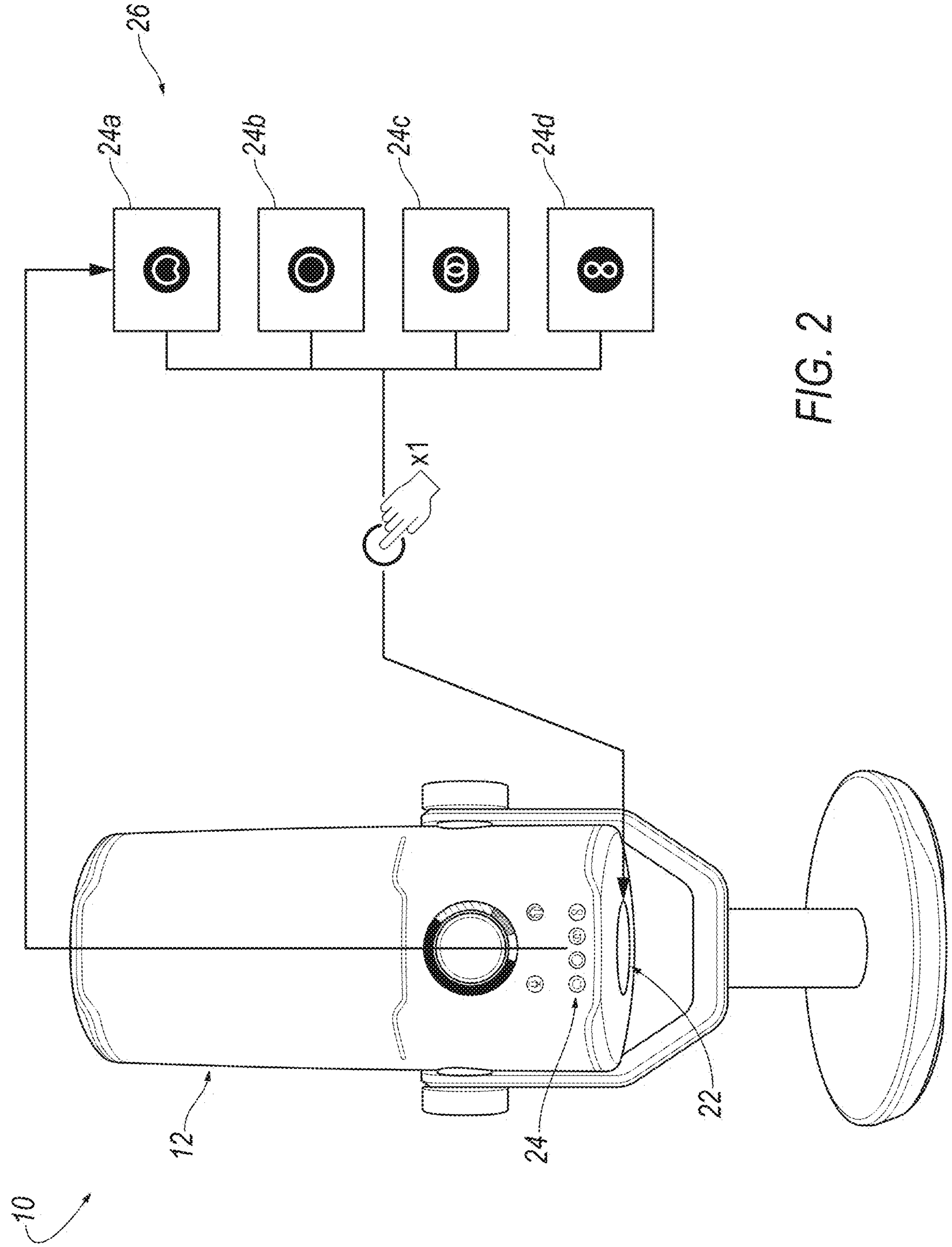
FIG. 2 illustrates a schematic view of the microphone capsule assembly with a descriptive polar pattern selection indicator legend.

Microphone capsule assembly 10 further includes a stand 18 for supporting housing 12. Housing 12 is pivotable about stand 18 such as shown in FIG. 2 to expose an underside of housing 12 for operator access. Stand 18 can be moved to place microphone capsule assembly 10 such that a front face (shown in FIG. 1) of microphone capsule assembly 10 is oriented towards a desired audio source.

Microphone capsule assembly 10 further includes various user interface input and output elements. The user interface elements include typical elements such as a volume knob 20 which enables an operator to adjust the headphone volume and the microphone gain.

In accordance with the present disclosure, the user interface elements further include a polar pattern button 22 (shown in FIG. 2) and a set of polar pattern indicators 24. Polar pattern button 22 enables an operator to select which recording pattern is to be realized by microphone array 30. A recording pattern, or "polar pattern", of a microphone defines a microphone's sound pickup sensitivity related to its angle and direction. The operator may select an appropriate recording pattern according to the operator's recording needs.

Referring now to FIG. 2, with continual reference to FIG. 1, a schematic view of microphone capsule assembly 10 with a descriptive polar pattern selection indicator legend 26 added thereto is shown. As indicated, electronic device 50 is configured to mix recording signals of the microphones of microphone array 30 in four different manners to realize the cardioid, omnidirectional, stereo, and bidirectional recording patterns of the microphones. To this end, as further indicated, polar pattern button 22 enables an operator to select which of the four recording patterns (i.e., which of the four selectable voice pick-up patterns) is to be realized by microphone array 30. Responsive to the recording pattern selected via polar pattern button 22, electronic device 50 mixes recording signals of the microphones of microphone array 30 in a manner specific to the selected recording pattern for the selected recording pattern to be realized.

In detail, the operator may use polar pattern button 22 to select the cardioid pattern. The cardioid pattern is useful for recording during individual podcasts and gaming, streaming, and voiceover applications. Responsive to the cardioid pattern being selected, electronic device 50 mixes recording signals of the microphones of microphone array 30 in a manner specific to the cardioid pattern for the cardioid pattern to be realized. While the cardioid pattern is being realized, a cardioid pattern indicator 24*a* is illuminated to notify an operator.

The operator may use polar pattern button 22 to select the omnidirectional pattern. The omnidirectional pattern is useful for recording during multi-person podcasts, conference calls, and field recording applications. Responsive to the omnidirectional pattern being selected, electronic device 50 mixes recording signals of the microphones of microphone array 30 in a manner specific to the omnidirectional pattern for the omnidirectional pattern to be realized. While the omnidirectional pattern is being realized, an omnidirectional pattern indicator 24*b* is illuminated to notify an operator.

The operator may use polar pattern button 22 to select the stereo pattern. The stereo pattern is useful for recording during singing, instrument playing, and orchestra recording applications. Responsive to the stereo pattern being selected, electronic device 50 mixes recording signals of the microphones of microphone array 30 in a manner specific to the stereo pattern for the stereo pattern to be realized. While the stereo pattern is being realized, a stereo pattern indicator 24*c* is illuminated to notify an operator.

The operator may use polar pattern button 22 to select the bidirectional pattern. The bidirectional pattern is useful for recording during interviews and vocal and instrumental duet recording applications. Responsive to the bidirectional pattern being selected, electronic device 50 mixes recording signals of the microphones of microphone array 30 in a manner specific to the bidirectional pattern for the bidirectional pattern to be realized. While the bidirectional pattern is being realized, a bidirectional pattern indicator 24*d* is illuminated to notify an operator.

Figure 3:
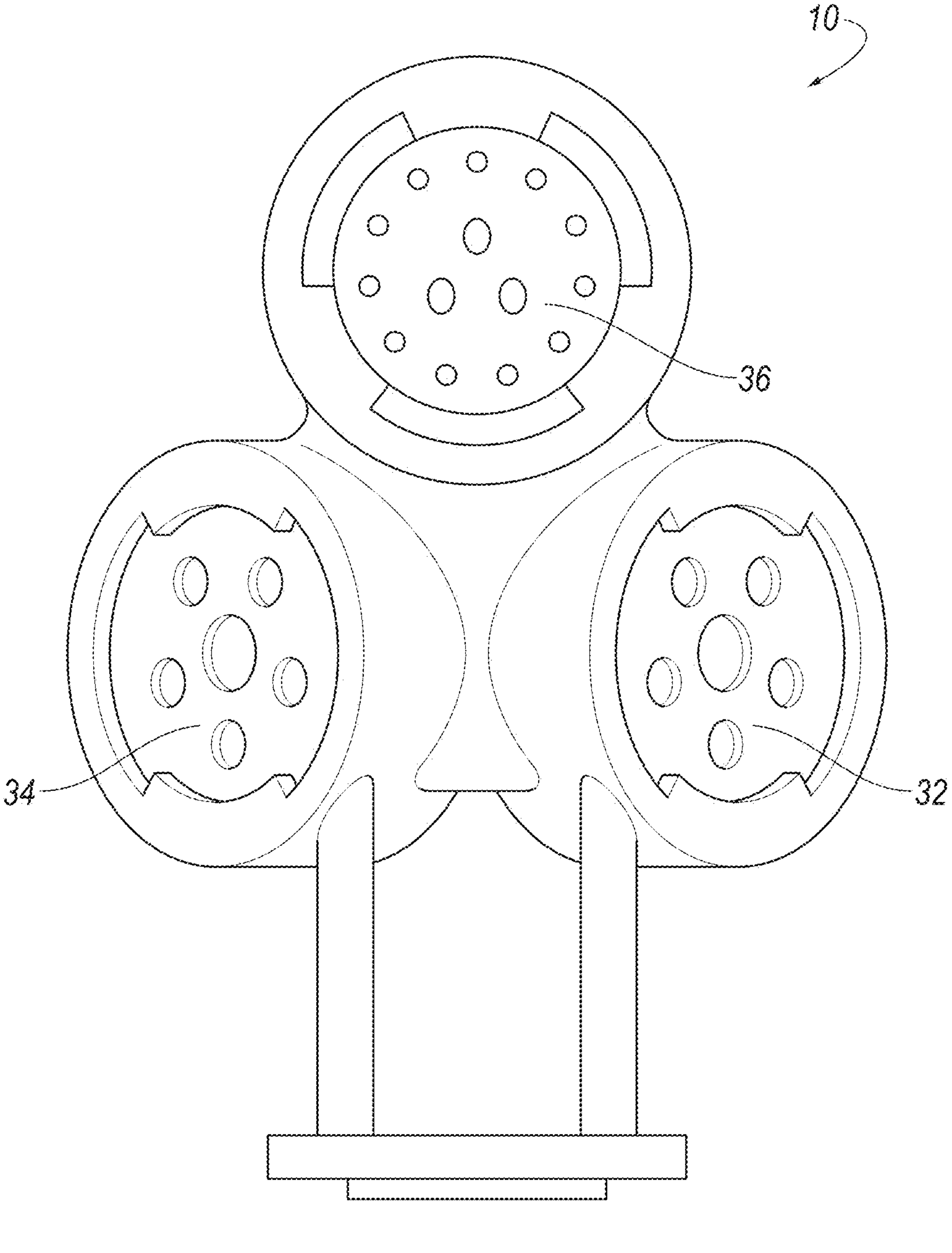
FIG. 3 illustrates a perspective view of a microphone array of the microphone capsule assembly, the microphone array having first, second, and third microphones.

Referring now to FIG. 3, a perspective view of microphone array 30 is shown. Microphone array 30 includes a first microphone 32, a second microphone 34, and a third microphone 36. For example, first, second, and third microphones 32, 34, and 36 may be condenser microphones. In this example, first, second, and third microphones 32, 34, and 36 are unidirectional microphones.

First microphone 32 is oriented to face in a leftward forward direction, second microphone 34 is oriented to face in a rightward forward direction, and third microphone 36 is oriented to face in a rearward direction. For instance, as shown in FIG. 3, first microphone 32 faces front to left at an angle of about 45°, second microphone 34 faces front to right at an angle of about 45°, and third microphone 36 faces rearward at an angle of about 180°. As such, first microphone 32 may be considered as being a "left" microphone, second microphone 34 may be considered as being a "right" microphone, and third microphone 36 may be considered as being a "back" or "rear" microphone.

Referring now to FIGS. 4A, 4B, 4C, and 4D, with continual reference to FIG. 3, the recording patterns of first, second, and third microphones 32, 34, and 36 taken individually in comparison with different realized recording patterns of microphone array 30 will be discussed. As indicated, electronic device 50 is operable to mix recording signals of first, second, and third microphones 32, 34, and 36 in different manners to realize the different recording patterns of microphone array 30.

Figure 4A:
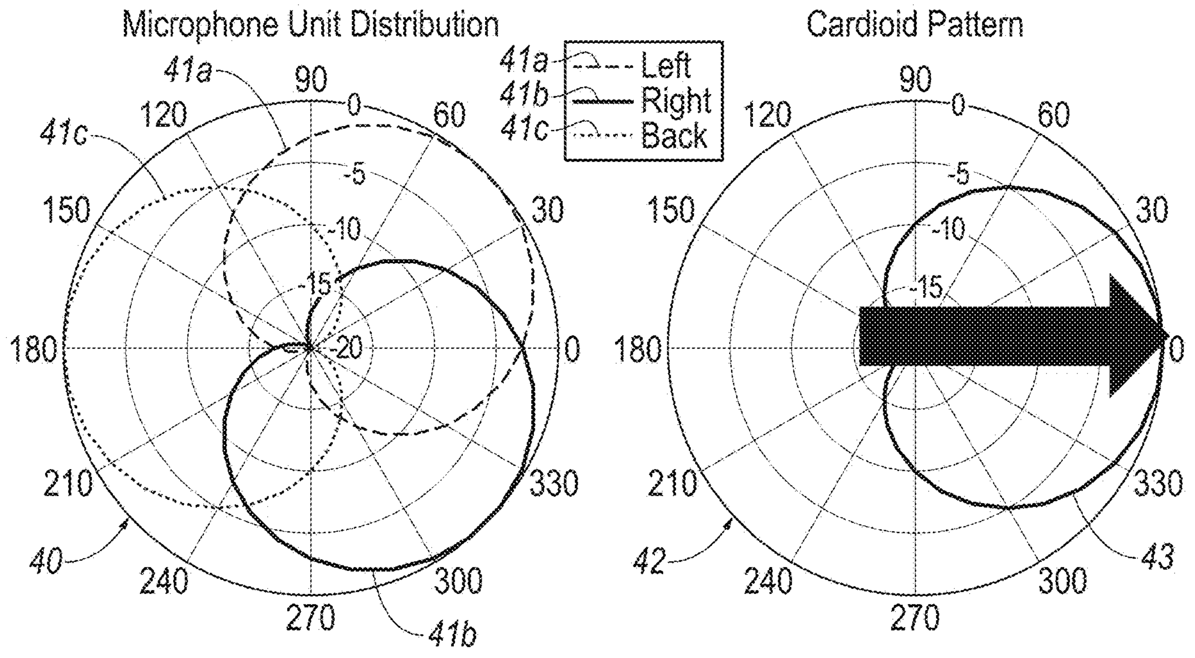
FIG. 4A illustrates a "microphone unit distribution" polar graph having first, second, and third plots indicative of the recording patterns of the first, second, and third microphones, respectively, and a first recording pattern polar graph having a plot indicative of a cardioid recording pattern of the microphone array when recording signals of the microphones are mixed in a first manner to realize the cardioid recording pattern.

Turning initially to FIG. 4A, FIG. 4A illustrates a "microphone unit distribution" polar graph 40 and a first recording pattern polar graph 42. Microphone unit distribution polar graph 40 includes first, second, and third plots 41*a*, 41*b*, and 41*c* indicative of the recording patterns of first, second, and third microphones 32, 34, and 36, respectively. First recording pattern polar graph 42 includes a plot 43 indicative of a cardioid recording pattern of microphone array 30 when recording signals of microphones 32, 34, and 36 are mixed in a first manner to realize the cardioid recording pattern. Particularly, for microphone array 30 to realize the cardioid recording pattern, electronic device 50 mixes the microphone recording signals by combining the recording signals of first and second microphones 32 and 34 while terminating the recording signal of third microphone 36.

Figure 4B:
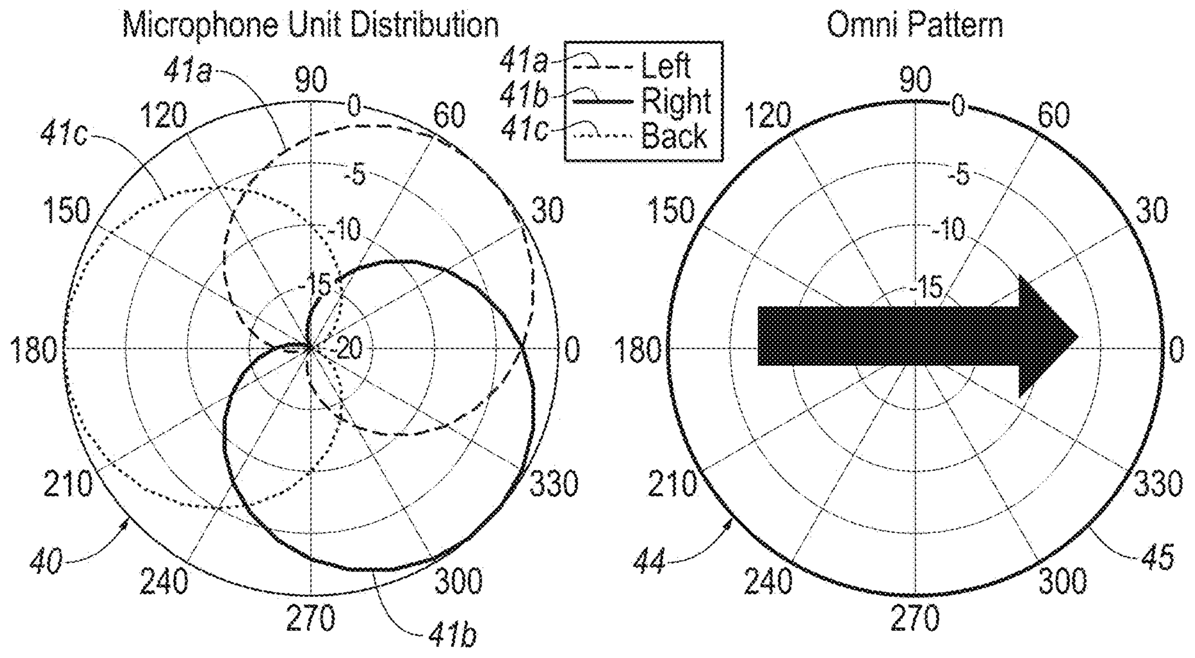
FIG. 4B illustrates the microphone unit distribution polar graph and a second recording pattern polar graph having a plot indicative of an omnidirectional recording pattern of the microphone array when recording signals of the microphones are mixed in a second manner to realize the omnidirectional recording pattern.

FIG. 4B illustrates microphone unit distribution polar graph 40 and a second recording pattern polar graph 44. Second recording pattern polar graph 44 includes a plot 45 indicative of an omnidirectional recording pattern of microphone array 30 when recording signals of microphones 32, 34, and 36 are mixed in a second manner to realize the omnidirectional recording pattern. Particularly, for microphone array 30 to realize the omnidirectional recording pattern, electronic device 50 mixes the microphone recording signals by combining the recording signals of first, second, and third microphones 32, 34, and 36.

Figure 4C:
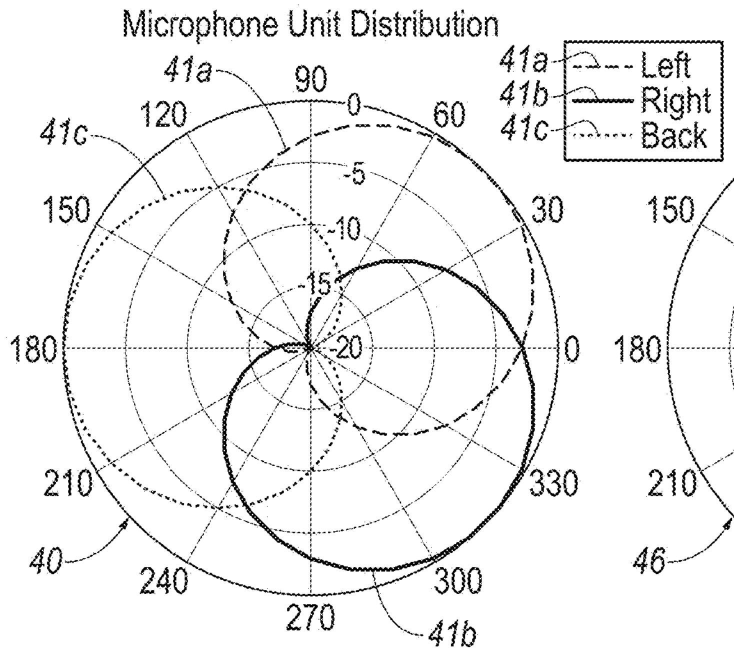
FIG. 4C illustrates the microphone unit distribution polar graph and a third recording pattern polar graph having first and second plots indicative of a stereo recording pattern of the microphone array when recording signals of the microphones are mixed in a third manner to realize the stereo recording pattern.

FIG. 4C illustrates microphone unit polar graph 40 and a third recording pattern polar graph 46. Third recording pattern polar graph 46 includes first and second plots 47*a* and 47*b* indicative of a stereo recording pattern of microphone array 30 when recording signals of microphones 32, 34, and 36 are mixed in a third manner to realize the stereo recording pattern. Particularly, for microphone array 30 to realize the stereo recording pattern, electronic device 50 mixes the microphone recording signals by maintaining separation of the recording signals of first and second microphones 32 and 34 and terminating the recording signal of third microphone 36.

Figure 4D:
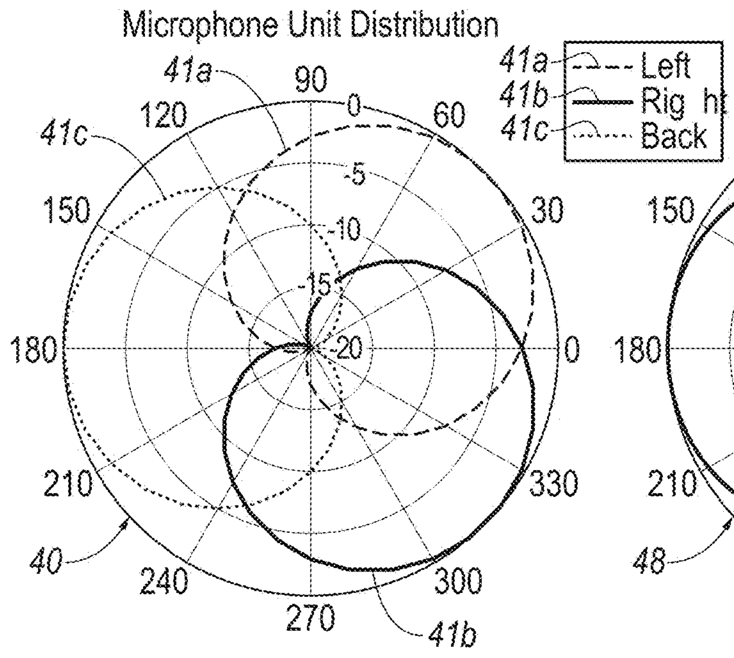
FIG. 4D illustrates the microphone unit distribution polar graph and a fourth recording pattern polar graph having a plot indicative of a bidirectional recording pattern of the microphone array when recording signals of the microphones are mixed in a fourth manner to realize the bidirectional recording pattern.

FIG. 4D illustrates microphone unit polar graph 40 and a fourth recording pattern polar graph 48. Fourth recording pattern polar graph 48 includes a plot 49 indicative of a bidirectional recording pattern of microphone array 30 when recording signals of microphones 32, 34, and 36 are mixed in a fourth manner to realize the bidirectional recording pattern. Particularly, for microphone array 30 to realize the bidirectional recording pattern, electronic device 50 mixes the microphone recording signals by combining the recording signal of first microphone 32, the recording signal of second microphone 34, and an inverse of the recording signal of third microphone 36.

Figure 5:
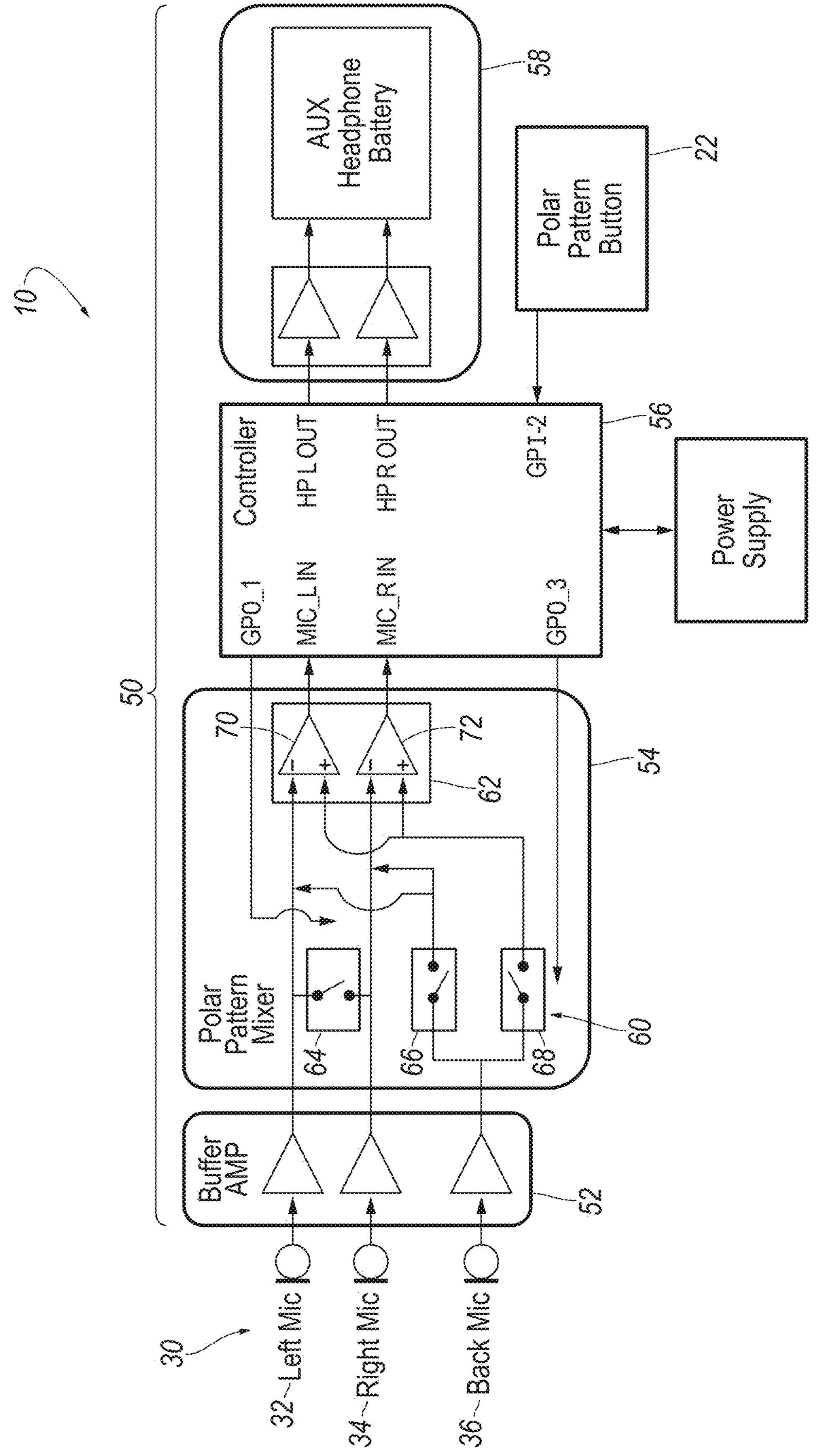
FIG. 5 illustrates a block diagram of the microphone capsule assembly, the block diagram depicting the microphone array and an electronic device of the microphone capsule assembly, the electronic device including a polar pattern mix part, a USB high speed audio codec part, and a headphone amplifier part, the polar pattern mix part including a buffer amplifier assembly and a polar pattern mixer, the polar pattern mixer having an analog switch assembly and an output amplifier assembly.

Referring now to FIG. 5, a block diagram of microphone capsule assembly 10 is shown. The block diagram depicts microphone array 30 and its first, second, and third (i.e., left, right, and back) microphones 32, 34, and 36. The block diagram further depicts electronic device 50. As shown in FIG. 5, electronic device 50 includes a polar pattern mix part comprised of a buffer amplifier assembly 52 and a polar pattern mixer 54. Electronic device 50 further includes a USB high speed audio codec part 56 and a headphone amplifier part 58.

Buffer amplifier assembly 52 includes first, second, and third buffer amplifiers configured to buffer first, second, and third recording signals of first, second, and third microphones 32, 34, and 36, respectively. Buffer amplifier assembly 52 is further configured to output the buffered first, second, and third recording signals to polar pattern mixer 54. In further detail, buffer amplifier assembly 52 is a positive feedback resonant circuit and has a gain such as on the order of 14 dB.

As indicated, polar pattern mixer 54 is configured to mix the first, second, and third recording signals received from buffer amplifier assembly 52 in different manners to realize different recording patterns of microphone array 30. In this way, polar pattern mixer 54 is configured to realize recording signal combinations which correspond to the cardioid, omnidirectional, stereo, and bidirectional recording patterns.

Polar pattern mixer 54 is further configured to output a left channel audio signal and a right channel audio signal to audio codec part 56. The left channel audio signal is an audio signal of the mixed recording signals, and the right channel audio signal is an audio signal of the mixed recording signals. In certain situations, such as when the cardioid, omnidirectional, or bidirectional recording pattern is realized, the left and right channel audio signals are the same audio signal of the same mixed recording signals. In other situations, such as when the stereo recording pattern is realized, the left and right audio signals are different audio signals comprised of different mixed recording signals.

In further detail, polar pattern mixer 54 includes an analog switch assembly 60 and an output amplifier assembly 62. Analog switch assembly 60 includes first, second, and third analog switches 64, 66, and 68. Each switch is switchable between an ON state (i.e., closed or connect state) and an OFF state (i.e., opened state). Switches 64, 66, and 68 are switchable according to different switching combinations respectively corresponding to the different recording patterns. As such, switching switches 64, 66, and 68 to a switching combination causes the first, second, and third recording signals received from buffer amplifier assembly 52 to be mixed in a manner specific to the switching combination for the corresponding recording pattern to be realized.

Output amplifier assembly 62 includes first and second output amplifiers 70 and 72. First output amplifier 70 is configured to amplify and output the left channel audio signal to audio codec part 56. Second output amplifier 72 is configured to amplify and output the right channel audio signal to audio codec part 56.

Audio codec part 56 is configured to receive the left and right channel audio signals from polar pattern mixer 54 via first and second output amplifiers 70 and 72. Audio codec 56 is further configured to process the left and right channel audio signals (e.g., encode the audio signals as digital signals) and output the processed left and right channel audio signals to headphone amplifier part 58.

Audio codec part 56 is further configured to realize USB signal input, output, and control. Such functions include audio codec part 56 being in communication with polar pattern button 22 to be apprised of an operator selection as to which of the recording patterns is to be realized by microphone array 30. Responsive to the selected recording pattern, audio codec part 56 is further configured to output requisite control signals to switch assembly 60 to control switching combinations of switches 64, 66, and 68 to cause the recording signals of microphones 32, 34, and 36 to be mixed in a manner specific to the selected recording pattern for the selected recording pattern to be realized.

Headphone amplifier part 58 is configured to amplify the processed left and right channel audio signals from audio codec part 56 and output these amplified audio signals to a headphone having left and right headset ports for the left and right ears of an operator wearing the headphone to hear.

Referring now to FIGS. 6A, 6B, 6C, and 6D, with continual reference to FIG. 5, the operations of polar mixer part 54 in mixing the first, second, and third recording signals of first, second and third microphones 32, 34, and 36 in different manners to realize the cardioid, omnidirectional, stereo, and bidirectional recording patterns of microphone array 30 will be described in greater detail.

Each of FIGS. 6A, 6B, 6C, and 6D illustrate a block diagram depicting microphone array 30, buffer amplifier assembly 52, and polar pattern mixer 54.

Figure 6A:
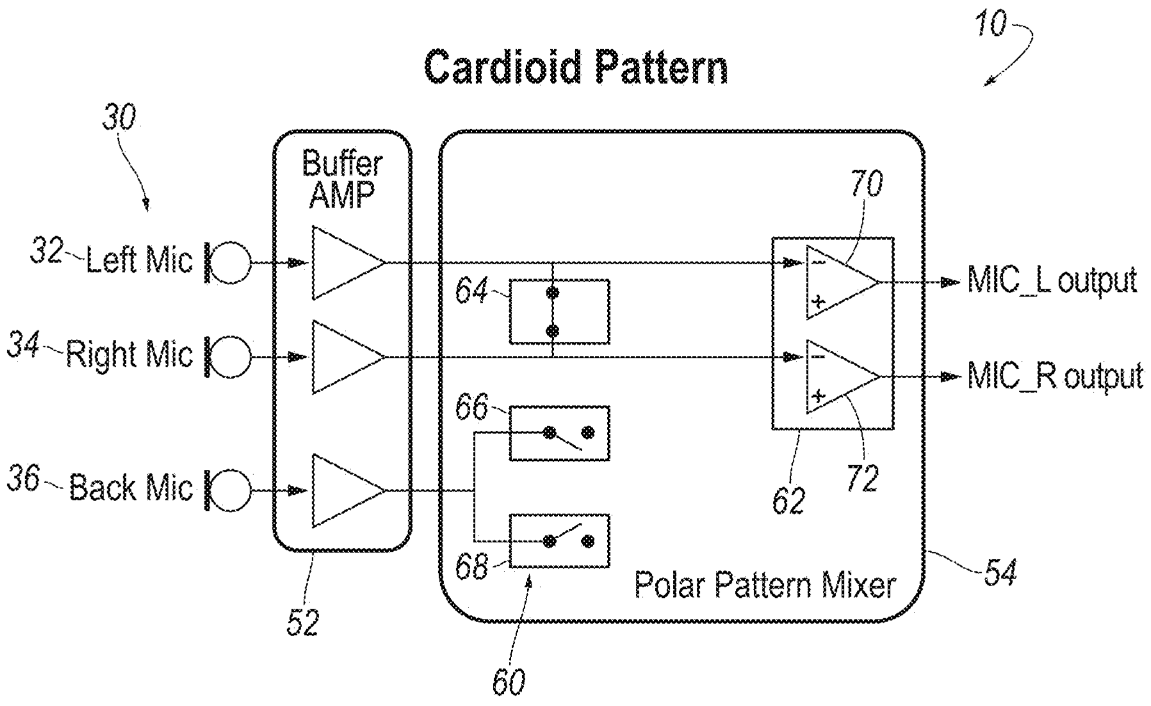
FIG. 6A illustrates a block diagram depicting the microphone array, the buffer amplifier assembly, and the polar pattern mixer, the block diagram further depicting a first configuration of the analog switch assembly and the output amplifier assembly for mixing recording signals of the microphones in the first manner to realize the cardioid recording pattern.

FIG. 6A depicts the operation of polar mixer part 54 in mixing the recording signals of microphones 32, 34, and 36 to realize the cardioid recording pattern of microphone array 30. The switching combination of switches 64, 66, and 68 to cause the recording signals to be mixed in a manner specific to the cardioid recording pattern involves, as shown in FIG. 6A, first switch 64 being switched ON and second and third switches 66 and 68 being switched OFF. As a result of switch assembly 60 having a configuration corresponding to this switching combination, the first and second recording signals of first and second microphones 32 and 34 are combined into a combined recording signal; and the recording signal of third microphone 36 is terminated. In this regard, the first and second recording signals of first and second microphones 32 and 34 are connected in parallel through first switch 64, with third recording signal of third microphone 36 being left unused. The combined recording signal is inputted to each of first and second output amplifiers 70 and 72 for amplification and output as left and right channel audio signals, respectively. As such, each of the left and right channel audio signals is an audio signal of the combined recording signal comprised of the first and second recording signals of first and second microphones 32 and 34.

Figure 6B:
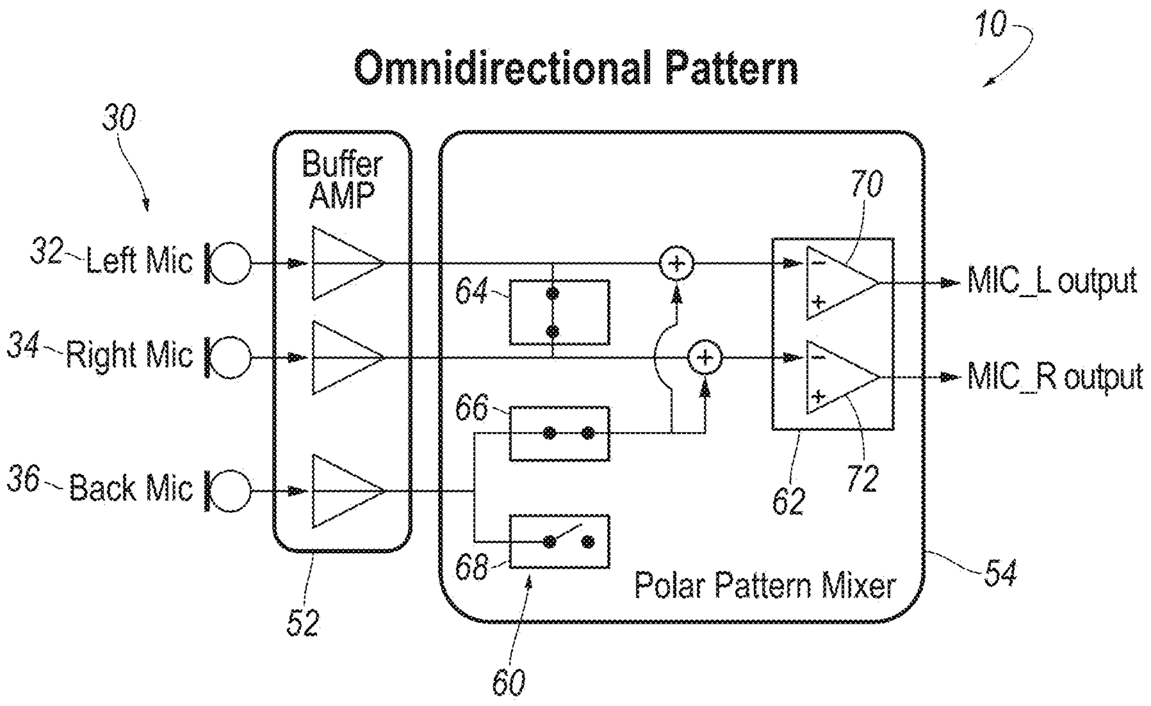
FIG. 6B illustrates a block diagram depicting the microphone array, the buffer amplifier assembly, and the polar pattern mixer, the block diagram further depicting a second configuration of the analog switch assembly and the output amplifier assembly for mixing recording signals of the microphones in the second manner to realize the omnidirectional recording pattern.

FIG. 6B depicts the operation of polar mixer part 54 in mixing the recording signals of microphones 32, 34, and 36 to realize the omnidirectional recording pattern of microphone array 30. The switching combination of switches 64, 66, and 68 to cause the recording signals to be mixed in a manner specific to the omnidirectional recording pattern involves, as shown in FIG. 6B, first and second switches 64 and 66 being switched ON and third switch 68 being switched OFF. As a result of switch assembly 60 having a configuration corresponding to this switching combination, the first, second, and third recording signals of first, second, and third microphones 32, 34, and 36 are combined into a combined recording signal. The combined recording signal is inputted to each of first and second output amplifiers 70 and 72 for amplification and output as left and right channel audio signals, respectively. As such, each of the left and right channel audio signals is an audio signal of the combined recording signal comprised of the first, second, and third recording signals of first, second, and third microphones 32, 34, and 36.

Furthermore, the omnidirectional mode corresponds to the cardioid mode with the third microphone signal of third microphone 36 being added to the mix. In the case of microphones 32, 34, and 36 all being unidirectional, the first, second, and third microphone signals are added through each output amplifier 70 and 72 according to their placement positions. Since the microphone signal sizes and phases received by the three microphones 32, 34, and 36 at different angles are different, the addition of microphone signals with the same frequency, different phases, and different amplitudes is not simply the addition of amplitudes. The phase must be calculated, the resulting signal is the final added signal, and the phases of 90° and 270° are basically the same. This addition operation ensures that the signal directivity at 90° and 270° will not be concave, with the omnidirectional recording pattern shown in FIG. 4B being obtained.

In addition, since the placement positions of first and second microphones 32 and 34 are 90° different, first and second microphones 32 and 34 are first mixed in parallel via first switch 64 and treated as one microphone. Then, an operational amplifier addition calculation is performed with third microphone 36.

Figure 6C:
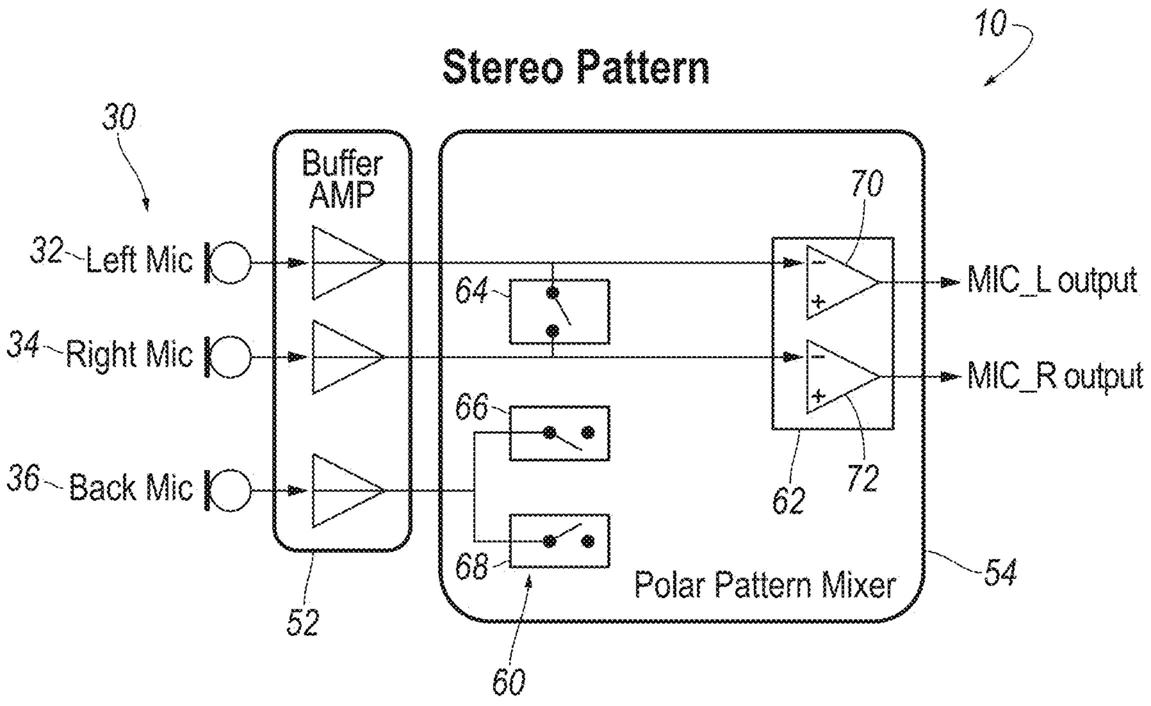
FIG. 6C illustrates a block diagram depicting the microphone array, the buffer amplifier assembly, and the polar pattern mixer, the block diagram further depicting a third configuration of the analog switch assembly and the output amplifier assembly for mixing recording signals of the microphones in the third manner to realize the stereo recording pattern.

FIG. 6C depicts the operation of polar mixer part 54 in mixing the recording signals of microphones 32, 34, and 36 to realize the stereo recording pattern of microphone array 30. The switching combination of switches 64, 66, and 68 to cause the recording signals to be mixed in a manner specific to the stereo recording pattern involves, as shown in FIG. 6C, first, second, and third switches 64, 66, and 68 being switched OFF. As a result of switch assembly 60 having a configuration corresponding to this switching combination, the first and second recording signals of first and second microphones 32 and 34 are maintained separated; and the recording signal of third microphone 36 is left unused. In this regard, the first and second recording signals of first and second microphones 32 and 34 are not mixed as first switch 64 is opened, and the first and second recording signals are independently inputted to the left and right channels without mixing in the third recording signal of third microphone 36. The first recording signal is inputted to first output amplifier 70 for amplification and output as a left channel audio signal; and the second recording signal is inputted to second output amplifier 72 for amplification and output as a right channel audio signal. As such, the left channel audio signal is an audio signal of the first recording signal of first microphone 32 and the right channel audio signal is an audio signal of the second recording signal of second microphone 34.

Figure 6D:
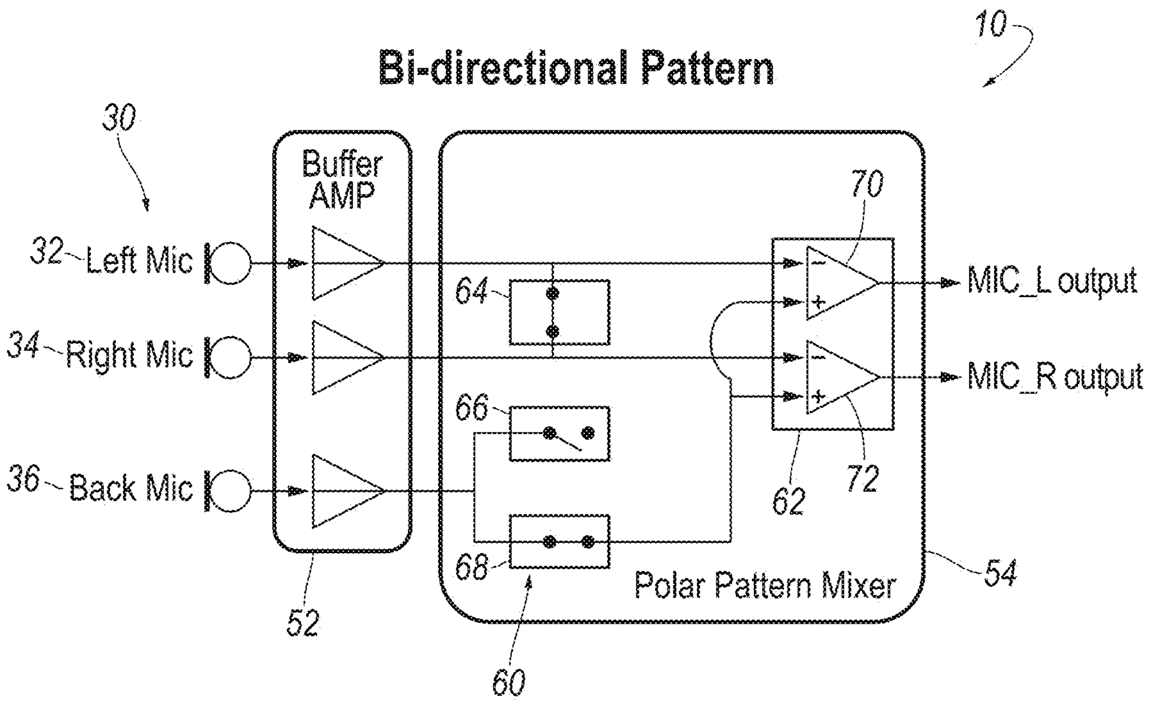
FIG. 6D illustrates a block diagram depicting the microphone array, the buffer amplifier assembly, and the polar pattern mixer, the block diagram further depicting a fourth configuration of the analog switch assembly and the output amplifier assembly for mixing recording signals of the microphones in the fourth manner to realize the bidirectional recording pattern.

FIG. 6D depicts the operation of polar mixer part 54 in mixing the recording signals of microphones 32, 34, and 36 to realize the bidirectional recording pattern of microphone array 30. The switching combination of switches 64, 66, and 68 to cause the recording signals to be mixed in a manner specific to the bidirectional recording pattern involves, as shown in FIG. 6D, first and third switches 64 and 68 being switched ON and second switch 66 being switched OFF. As a result of switch assembly 60 having a configuration corresponding to this switching combination, (i) the first and second recording signals of first and second microphones 32 and 34 and (ii) an inverse of the third recording signal of third microphone 36 are combined into a combined recording signal. The combined recording signal is inputted to each of first and second output amplifiers 70 and 72 for amplification and output as left and right channel audio signals, respectively. As such, each of the left and right channel audio signals is an audio signal of the combined recording signal comprised of the first recording signal of first microphone 32, the second recording signal of second microphones 34, and an inverse of the third recording signal of third microphones 36.

Furthermore, in the bidirectional mode, contrary to the omnidirectional mode, the first and second recording signals of first and second microphones 32 and 34 are connected in parallel through closed switch 64 as one recording signal, and then an operational amplifier subtraction calculation is performed with the third recording signal of third microphone 36. The first and second recording signals and the third recording signal are signals with equal amplitude and the same phase. After subtraction, portions of the microphone signals cancel each other out so that the microphone signal amplitude at 90° and 270° will be low, forming a valley.

As described, a microphone capsule assembly in accordance with the present disclosure realizes four recording patterns in one product. The microphone capsule assembly is a "3-in-1" microphone assembly having one less microphone than comparable "4-in-1" microphone assemblies. Further, in conjunction with having three microphones, the microphone capsule assembly employs an analog switch assembly and an output amplifier assembly for microphone recording signal combinations in lieu of employing an audio codec IC.

While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A microphone assembly, comprising:

a microphone array including first, second, and third microphones and no other microphones; and a mixer including an analog switch assembly and an amplifier assembly configured to mix recording signals of the microphones in different manners to realize different recording patterns of the microphone array, the different recording patterns of the microphone array include a cardioid recording pattern, an omnidirectional recording pattern, a stereo recording pattern, and a bidirectional recording pattern;

wherein the analog switch assembly includes first, second, and third switches, each switch being switchable between an ON state and an OFF state; and the analog switch assembly and the amplifier assembly are configured to mix the recording signals of the microphones in a first manner by switching the switches into a first ON/OFF state configuration to cause the recording signals of the first and second microphones to be combined and the recording signal of the third microphone to be terminated to thereby realize the cardioid recording pattern, in a second manner by switching the switches into a second ON/OFF state configuration to cause the recording signals of the first, second, and third microphones to be combined to thereby realize the omnidirectional recording pattern, in a third manner by switching the switches into a third ON/OFF state configuration to cause the recording signals of the first and second microphones to maintain separation and the recording signal of the third microphone to be terminated to thereby realize the stereo recording pattern, and in a fourth manner by switching the switches into a fourth ON/OFF state configuration to cause the recording signal of the first microphone, the recording signal of the second microphone to be combined and an inverse of the recording signal of the third microphone to thereby realize the bidirectional recording pattern.

2. The microphone assembly of claim 1 wherein:

the first microphone is oriented to face in a leftward forward direction, the second microphone is oriented to face in a rightward forward direction, and the third microphone is oriented to face in a rearward direction.

3. The microphone assembly of claim 1 wherein:

the first microphone is oriented to face at an angle of 45° relative to a given direction, the second microphone is oriented to face at an angle of −45° relative to the given direction, and the third microphone is oriented to face at an angle of 180° relative to the given direction.

4. The microphone assembly of claim 1 wherein:

the first, second, and third microphones are unidirectional microphones.

5. The microphone assembly of claim 1 wherein:

the amplifier assembly includes a first amplifier for outputting a left channel audio signal of the mixed recording signals and a second amplifier for outputting a right channel audio signal of the mixed recording signals.

6. The microphone assembly of claim 5 wherein:

when the switches are switched into the first ON/OFF state configuration the first switch is switched to the ON state and the second and third switches are switched to the OFF state, the recording signals of the first and second microphones are combined into a combined recording signal with the left channel audio signal being according to the combined recording signal and the right channel audio signal being according to the combined recording signal whereby the recording signals of the microphones realize the cardioid recording pattern of the microphone array.

7. The microphone assembly of claim 5 wherein:

when the switches are switched into the second ON/OFF state configuration the first and second switches are switched to the ON state and the third switch is switched to the OFF state, the recording signals of the first, second, and third microphones are combined into a combined recording signal with the left channel audio signal being according to the combined recording signal and the right channel audio signal being according to the combined recording signal whereby the recording signals of the microphones realize the omnidirectional recording pattern of the microphone array.

8. The microphone assembly of claim 5 wherein:

when the switches are switched into the third ON/OFF state configuration the first, second, and third switches are switched to the OFF state, the recording signals of the first and second microphones are maintained separated with the left channel audio signal being according to the recording signal of the first microphone and the right channel audio signal being according to the recording signal of the second microphone whereby the recording signals of the microphones realize the stereo recording pattern of the microphone array.

9. The microphone assembly of claim 5 wherein:

when the switches are switched into the fourth ON/OFF state configuration the first and third switches are switched to the ON state and the second switch is switched to the OFF state, the recording signals of the first and second microphones and an inverse of the recording signal of the third microphone are combined into a combined recording signal with the left channel audio signal being according to the combined recording signal and the right channel audio signal being according to the combined recording signal whereby the recording signals of the microphones realize the bidirectional recording pattern of the microphone array.

10. A microphone capsule assembly, comprising:

a first microphone oriented to face in a leftward forward direction;

a second microphone oriented to face in a rightward forward direction;

a third microphone oriented to face in a rearward direction, wherein the leftward forward direction is at an angle of about 90° relative to the rightward forward direction and the rearward direction is at an angle of about 135° relative to the left forward direction; and a mixer including an analog switch assembly having first, second, and third switches and an amplifier assembly having a first amplifier and a second amplifier configured to mix recording signals of the microphones in a first manner to realize a cardioid recording pattern of the microphones, in a second manner to realize an omnidirectional recording pattern of the microphones, in a third manner to realize a stereo recording pattern of the microphones, and in a fourth manner to realize a bidirectional recording pattern of the microphones; and wherein the microphone capsule assembly includes no other microphones.

11. The microphone capsule assembly of claim 10 wherein:

the first, second, and third microphones are unidirectional microphones.

* * * * *